United States Patent [19]

Yamanishi

[11] Patent Number: 5,161,029
[45] Date of Patent: Nov. 3, 1992

[54] IMAGE FORMING APPARATUS FOR CONTROLLING STEPPING MOTOR IN ACCORDANCE WITH COPY MAGNIFICATION

[75] Inventor: Eiichi Yamanishi, Yokohama, Japan

[73] Assignee: Kabushiki Kaisha Toshiba, Kawasaki, Japan

[21] Appl. No.: 452,061

[22] Filed: Dec. 18, 1989

[30] Foreign Application Priority Data

Dec. 23, 1988 [JP] Japan .................. 63-324941

[51] Int. Cl.⁵ .................. H04N 1/10; H04N 1/17; H04N 1/23; H04N 1/393

[52] U.S. Cl. .................. 358/296; 358/451; 358/486; 358/497

[58] Field of Search ............ 358/296, 300, 451, 474, 358/475, 494, 497, 486; 355/243, 233, 235, 55; 388/811, 902

[56] References Cited

U.S. PATENT DOCUMENTS

| | | | |
|---|---|---|---|
| 4,211,482 | 7/1980 | Arai | 355/243 |
| 4,564,288 | 1/1986 | Nonoue | 355/233 |
| 4,586,808 | 5/1986 | Tanimoto | 355/243 |
| 4,622,500 | 11/1986 | Budelman | 388/811 |
| 4,631,577 | 12/1986 | Yamanishi | 346/76 PH |
| 4,731,657 | 3/1988 | Miyagi | 358/497 |
| 4,740,844 | 4/1988 | Yoshimara | . |
| 4,769,673 | 9/1988 | Tomosada | 355/233 |

FOREIGN PATENT DOCUMENTS

3802199 9/1988 Fed. Rep. of Germany .
3810833 10/1988 Fed. Rep. of Germany .

OTHER PUBLICATIONS

F. Prautzsch, "The Motor Handbook", pp. 3, 58–63 (no translation).
English Abstract for German Patent Document 3810833.
English Abstract for German Patent Document 3802199.

Primary Examiner—Benjamin R. Fuller
Assistant Examiner—Scott A. Rogers
Attorney, Agent, or Firm—Foley & Lardner

[57] ABSTRACT

A lamp mounted on a first carriage emits light onto an original placed on an original table. A photoelectric converter converts light reflected by the original into an electrical signal by using mirrors, a zoom lens, and the like mounted on a second carriage. In accordance with the electrical signals supplied from the photoelectric converter via a control unit, a thermal head transfers inks from an ink ribbon onto paper wound around a platen drum to form an image corresponding to an original image on the paper. An operation panel has a magnification-set key for setting the magnification of an image to be formed by the thermal head. A stepping motor drives the first and second carriages. When the magnification set by the magnification-set key falls within a predetermined range, a motor drive in the control unit sets the speed of the stepping motor to a high speed and supplies a high current. When the magnification exceeds the predetermined range, the motor driver sets the speed of the stepping motor to a low speed and supplies a low current.

8 Claims, 8 Drawing Sheets

IMAGE FORMING APPARATUS FOR CONTROLLING STEPPING MOTOR IN ACCORDANCE WITH COPY MAGNIFICATION

BACKGROUND OF THE INVENTION

1. Field of the Invention

The present invention relates to an image forming apparatus for forming an image on paper in accordance with a signal corresponding to an image of an original read by a scanner and, more particularly, to the drive control of a scanner according to an image formation magnification.

2. Description of the Related Art

Recently, a copying machine called a digital copying machine has been developed. This copying machine reads an image of an original by a scanner unit, supplies a signal corresponding to the read original image to a thermal head, and transfers an ink on an ink ribbon onto paper by the thermal head, thereby forming an image corresponding to the original image.

The scanner unit comprises a first carriage on which a light source for emitting light onto an original is arranged, a second carriage on which a plurality of mirrors for bending an optical path of light reflected from the original are arranged, a zoom lens for guiding light from the mirrors to a photoelectric converter and changing a magnification of an image to be formed, a mirror unit for guiding light transmitted through the zoom lens to the photoelectric converter and correcting an optical path length if the magnification changes, the photoelectric converter for receiving the light reflected from the original and converting the received light into an electrical signal, and a stepping motor for driving the first and second carriages.

With the above arrangement, in order to read an image of an original, the light source is turned on, and the first and second carriages are moved along an original table. Light reflected by the original is guided to the photoelectric converter sequentially through the mirrors on the second carriage, the zoom lens, and the mirror unit and converted into an electrical signal.

An enlargement magnification of the copying machine of this type was generally up to about 150%. In recent years, however, enlargement up to 400% can be performed. In order to perform copying at a magnification of 150% or more by this copying machine, a rotational speed of the stepping motor for driving the first and second carriages is decreased lower than a speed at a normal copying magnification (70% to 150%), thereby decreasing a speed of scanning an original. When the rotational speed of the stepping motor is decreased, however, vibration or noise of the stepping motor is undesirably increased.

When the rotational speed is low, therefore, a torque (driving force) of the stepping motor may be set such that no vibration or noise is produced. When the torque of the stepping motor is decreased, however, a desired torque cannot be obtained upon copying at a normal magnification.

SUMMARY OF THE INVENTION

It is an object of the present invention to provide an image forming apparatus in which when an image is formed at a normal magnification, the torque of a stepping motor is not decreased, and when the stepping motor is driven at a low speed in order to form an image at a large magnification, vibration or noise can be suppressed.

The above object of the present invention is achieved by an image forming apparatus having the following arrangement.

An image forming apparatus for forming an image of an original on a transfer material, the apparatus comprising:
  means for scanning the image of the original;
  means for moving the scanning means along the original;
  means for forming the image scanned by the scanning means on the transfer material;
  first setting means for setting the magnification of the image to be formed by the forming means; and
  second setting means for setting the moving speed of the moving means to a first speed, and supplying a first current to the moving means when the magnification set by the first setting means falls within a predetermined range, and setting the moving speed of the moving means to a second speed which is lower than the first speed, and supplying a second current which is lower than the first current to the moving means when the magnification exceeds the predetermined range.

According to the present invention, there is provided an image forming apparatus in which when an image is to be formed at a normal magnification, a torque of a stepping motor need not be decreased, and when the stepping motor is driven at a low speed in order to perform copying at a large magnification, vibration or noise can be suppressed.

DETAILED DESCRIPTION OF THE PREFERRED EMBODIMENTS

An embodiment of the present invention will be described below with reference to the accompanying drawings.

Figure 1:
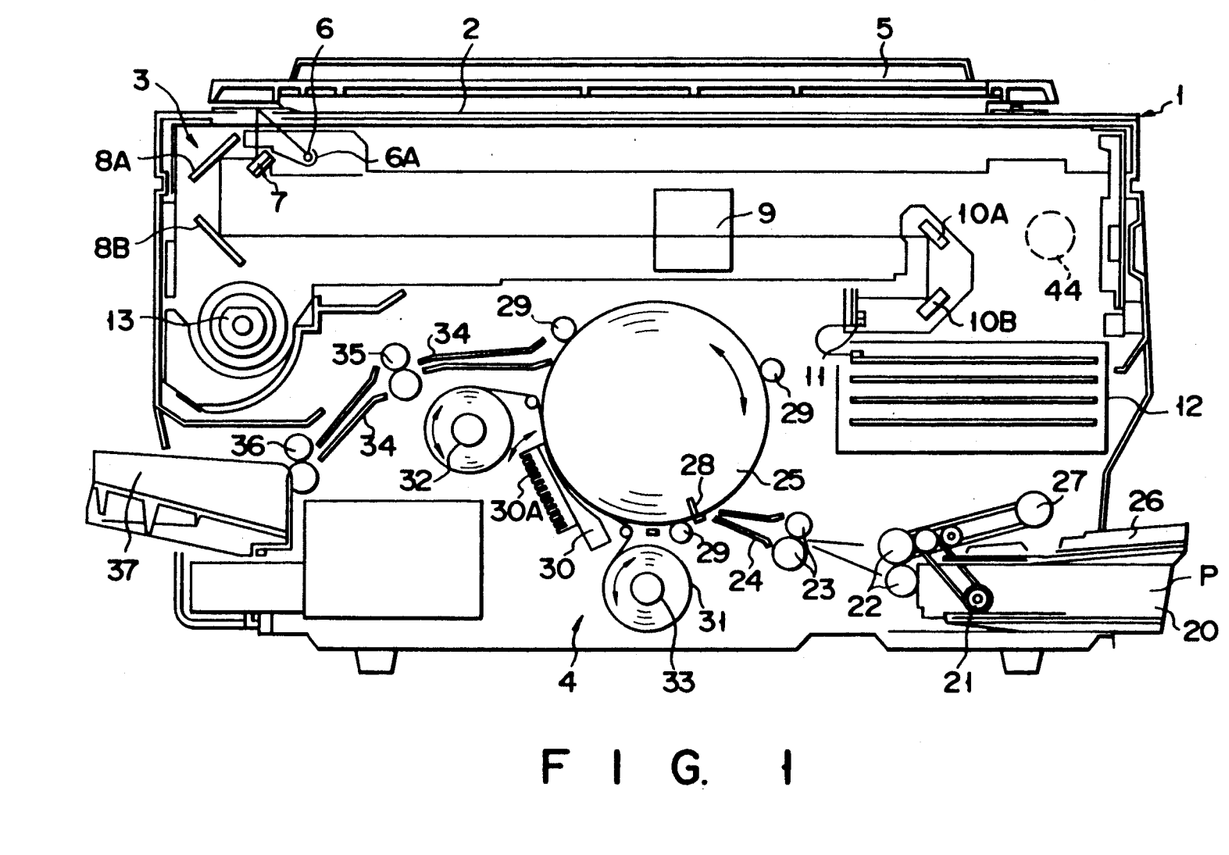
FIG. 1 is a sectional view schematically showing an embodiment of an image forming apparatus.

FIG. 1 shows a thermal transfer digital color copying machine which can perform multi-color copying.

An original table 2 constituted by transparent glass is located on an upper portion of a copying machine main body 1, and an original is set on the table 2. A scanning unit 3 for exposure-scanning and reading an original and an image forming unit 4 for forming an image corresponding to the image read from the original by the scanning unit 3 on paper are arranged at the lower surface side of the table 2. An original cover 5 for covering the table 2 is arranged to be opened/closed on the table 2.

The scanning unit 3 comprises a lamp 6 as a light source, a reflector 6A for reflecting light emitted from the lamp 6 onto an original set on the table 2, a mirror 7 for guiding light reflected by the original to a mirror 8A, mirrors 8A and 8B for bending an optical path, a zoom lens 9 for transmitting light from the mirror 8B and changing a magnification of an image to be formed, mirror units 10A and 10B for guiding light transmitted through the lens 9 and correcting an optical path length when the magnification is changed, a photoelectric converter 11 for receiving the light reflected by an original O and converting it into an electrical signal, and a fan 13 for cooling the interior of the main body 1.

An output signal from the converter 11 is supplied to a control unit 12. The control unit 12 performs predetermined signal processing for the output signal and supplies the signal to a thermal head (to be described later).

An arrangement of the image forming unit 4 is as follows.

A paper feed cassette 20 containing paper P is detachably mounted at a lower portion of the main body 1. A pick-up roller 21 is arranged near the cassette 20 and picks up the paper P in the cassette 20 one by one. Conveyor rollers 22 convey the paper P picked up by the pick-up roller 21 to resist rollers 23. The resist rollers 23 align the distal end of the conveyed paper P and convey it to a platen drum 25 via a guide 24.

A manual feed guide 26 for manually feeding paper is mounted above the cassette 20. Paper P supplied from the guide 26 is conveyed to the conveyor rollers 22 by a paper feed roller 27, and conveyed to the platen drum 25 in the same manner as described above.

The drum 25 is arranged at substantially the center of the image forming unit 4. The surface of the drum 25 is made of an elastic material such as rubber. The circumference of the drum 25 is set slightly longer than the length (longitudinal size) of a maximum paper size. A gripper 28 for gripping the leading end of paper conveyed by the resist rollers 23 is located at a portion of the drum 25. A plurality of pressure rollers 29 for urging the paper P against the drum 25 are arranged around the drum 25 so as to be separated from each other with predetermined intervals therebetween.

A thermal head 30 is located at a lower left portion from the drum 25. A radiator 30A is integrally mounted on the head 30. An ink ribbon 31 is located between the head 30 and the drum 25, and the paper P gripped by the gripper 28 is placed between the ribbon 31 and the drum 25.

Both the ends of the ribbon 31 are wound around cores 32 and 33. The cores 32 and 33 are connected to a driving shaft of a motor (not shown) via a driving force transmission mechanism (not shown) and rotated as needed. On the ribbon 31, inks of yellow, magenta, cyan, and black are sequentially arranged. Each ink has substantially the same size as the maximum paper size.

The head 30 is normally separated from the drum 25 and urged against the drum 25 upon printing, thereby urging the ribbon 31 against the paper P.

The paper P whose leading end is fixed by the gripper 28 is wound around the drum 25 upon clockwise rotation of the drum 25. When the gripper 28 passes by the head 30, the head 30 is urged against the drum 25 to start printing. At this time, the first color ink of the ribbon 31 is moved to a printing start position and moved together with the paper P in accordance with printing of an image.

When printing using the first color ink of the ribbon 31 is finished, the drum 25 has rotated almost once. At this time, the head 30 is separated from the drum 25, and the ribbon 31 is taken up to move the second color ink to the printing start position. There after, the drum 25 is rotated clockwise again, and an image of the second color ink is superposed on the image formed by the first color ink in the same manner as described above.

In the case of full-color copying, the same printing operation is repeated four times for yellow, magenta, cyan, and black or three times for yellow, magenta, and cyan. Note that in the case of monochromatic printing of, e.g., black, the printing operation is performed only once.

When the predetermined printing operation is finished as described above, the drum 25 is rotated clockwise until the trailing end of the paper P reaches a paper exhaust guide 34. When the trailing end of the paper P reaches the guide 34, the drum 25 is rotated counterclockwise, and the trailing end of the paper P is separated from the drum 25 and guided into the guide 34 by a separating gate (not shown). When the gripper 28 is moved close to the guide 34 upon rotation of the drum 25, the leading end of the paper P is released from the gripper 28. Thereafter, the paper P is conveyed to a paper exhaust tray 37 by conveyor rollers 35 and 36 located midway along the guide 34.

Figure 2:
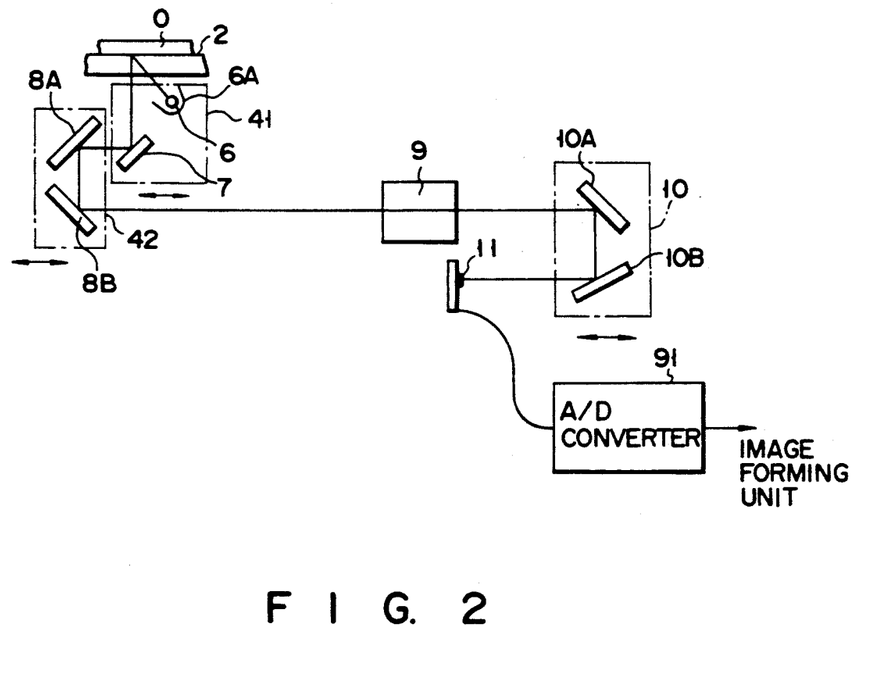
FIG. 2 is a schematic view showing a part of FIG. 1.
Figure 3:
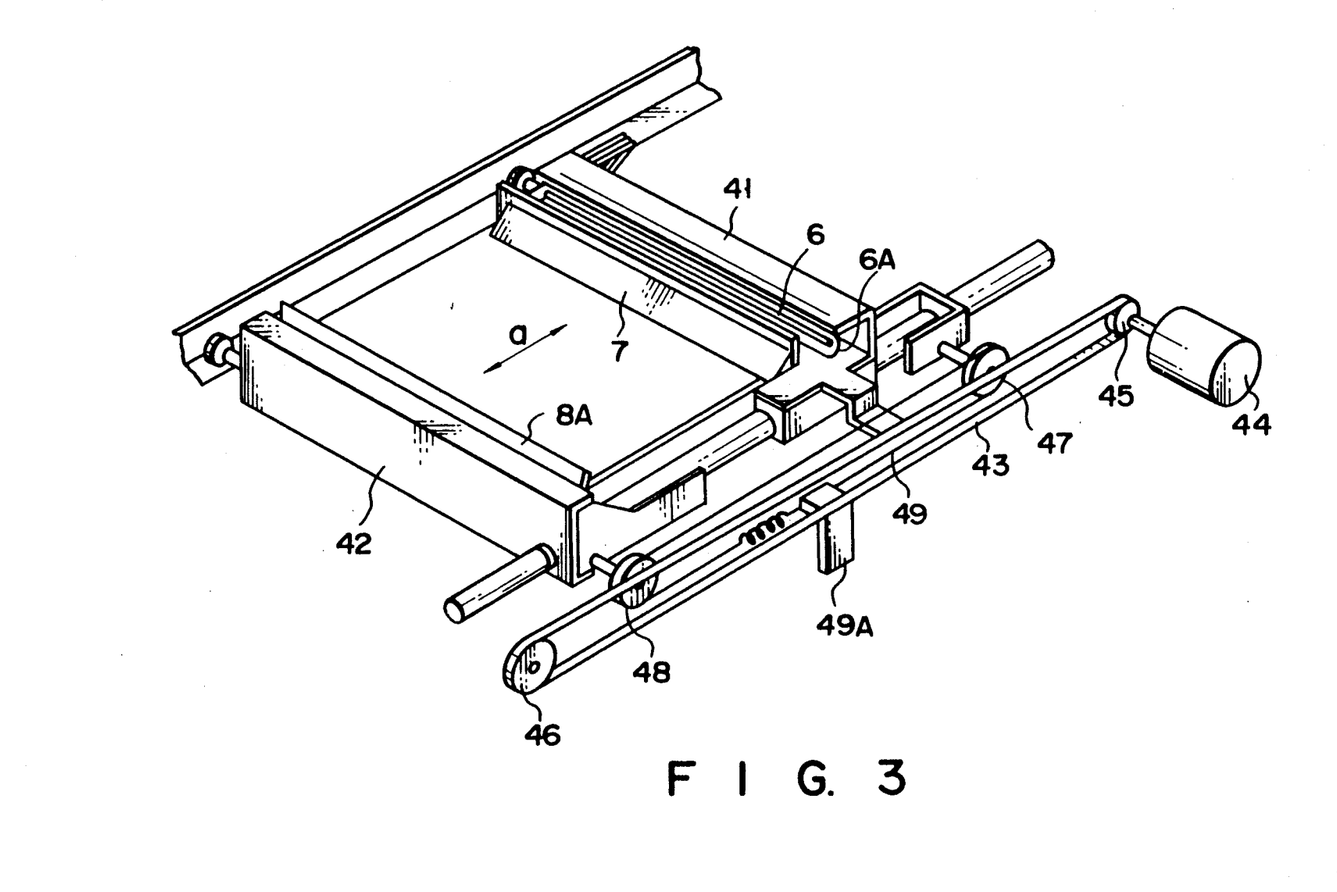
FIG. 3 is a perspective view showing a part of FIG. 1.

FIGS. 2 and 3 show the scanning unit 3. The lamp 6, the reflector 6A, and the mirror 7 are arranged on the first carriage 41. The mirrors 8A and 8B are arranged on the second carriage 42. As shown in FIG. 3, the first carriage 41 is connected to a timing belt 43 which is looped between a drive pulley 45 connected to a rotating shaft of a stepping motor 44 and an idle pulley 46. Pulleys 47 and 48 are arranged on the second carriage 42, and a wire 49 is looped between the pulleys 47 and 48. The ends of the wire 49 are fixed to a fixing portion 49A, and its middle portion is fixed to the first carriage 41. When the first carriage 41 moves, therefore, since the second carriage 42 moves at a speed ½ of a speed of the first carriage 41 in the same direction, scanning can be performed while the optical path length to the zoom lens 9 is maintained constant.

A focal length of the lens 9 is fixed, and the lens 9 is moved along the optical axis when a magnification is changed.

The mirror units 10A and 10B are located on a movable frame 10. When a copying magnification is changed, the frame 10 is moved such that the mirror units 10A and 10B set an optical path length corresponding to the changed magnification.

The photoelectric converter 11 photoelectrically converts light reflected from the original O and separately outputs an image of the original O as light color signals of cyan, green, and yellow (or red, green, and blue). The converter 11 is mainly constituted by, e.g., a CCD line image sensor. The CCD line image sensor has cyan, green, and yellow filters in correspondence with one photoelectric conversion element, and one pixel is constituted by three continuous elements including cyan, green, and yellow. An output from the converter 11 is supplied to an A/D converter 91 (to be described later).

The zoom lens 9 is connected to a spiral shaft (not shown) driven by a stepping motor (not shown). When the spiral shaft is rotated, the lens 9 is moved along the optical axis.

Figure 4:
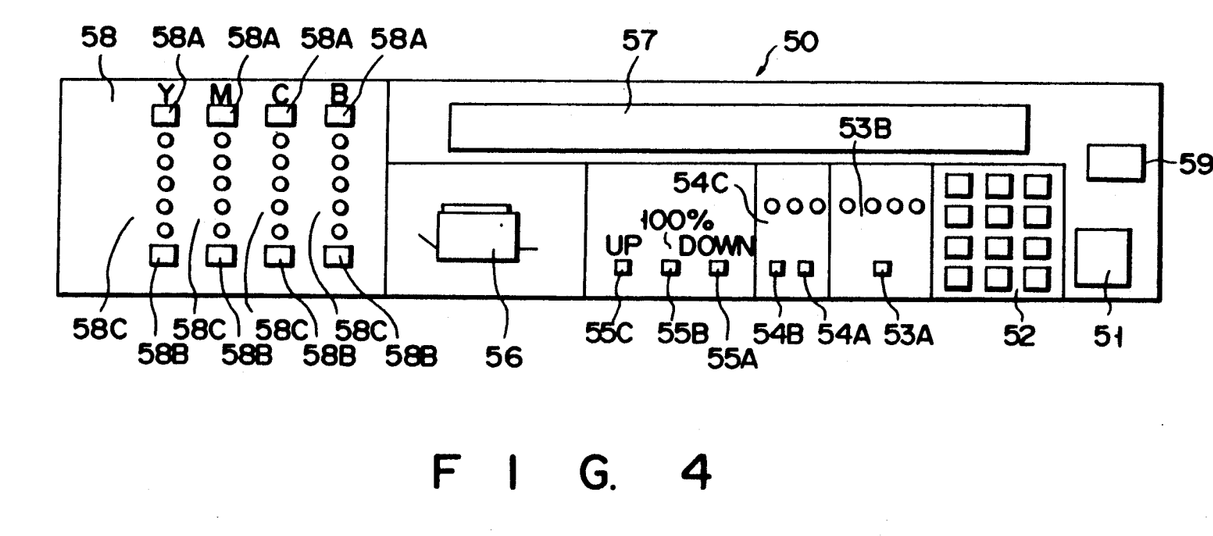
FIG. 4 is a plan view showing an arrangement of an operation panel.

FIG. 4 shows the operation panel 50 located on the upper portion of the copying machine main body 1.

The operation panel 50 includes a copy key 51 for starting the copy operation, ten keys 52 for setting, e.g., the number of copies, a mode set key 53A for setting, e.g., a color copy mode or a black/white copy mode, a mode indicator 53B for indicating a copy mode set by the mode set key 53A, density set keys 54A and 54B for setting a copy density, a density indicator 54C for indicating a copy density set by the density set keys 54A and 54B, a DOWN key 55A, a 100% key 55B, and an UP key 55C as magnification set keys for arbitrarily setting a magnification from 70% to 400% as a copy magnification, a jam indicator 56 for indicating a jam position of paper, a message display 57 for displaying the number of copies, a copy magnification, and various messages, a color density set unit 58, and a clear key 59 for clearing various copy conditions.

The color density set unit 58 is for setting a color density of each of yellow Y, magenta M, cyan C, and black B and constituted by a plurality of color density UP keys 58A each for increasing the color density of a corresponding color, a plurality of color density DOWN keys 58B each for decreasing the color density of a corresponding color, and a plurality of color density indicators 58C each for indicating the color density of a corresponding color.

Figure 5:
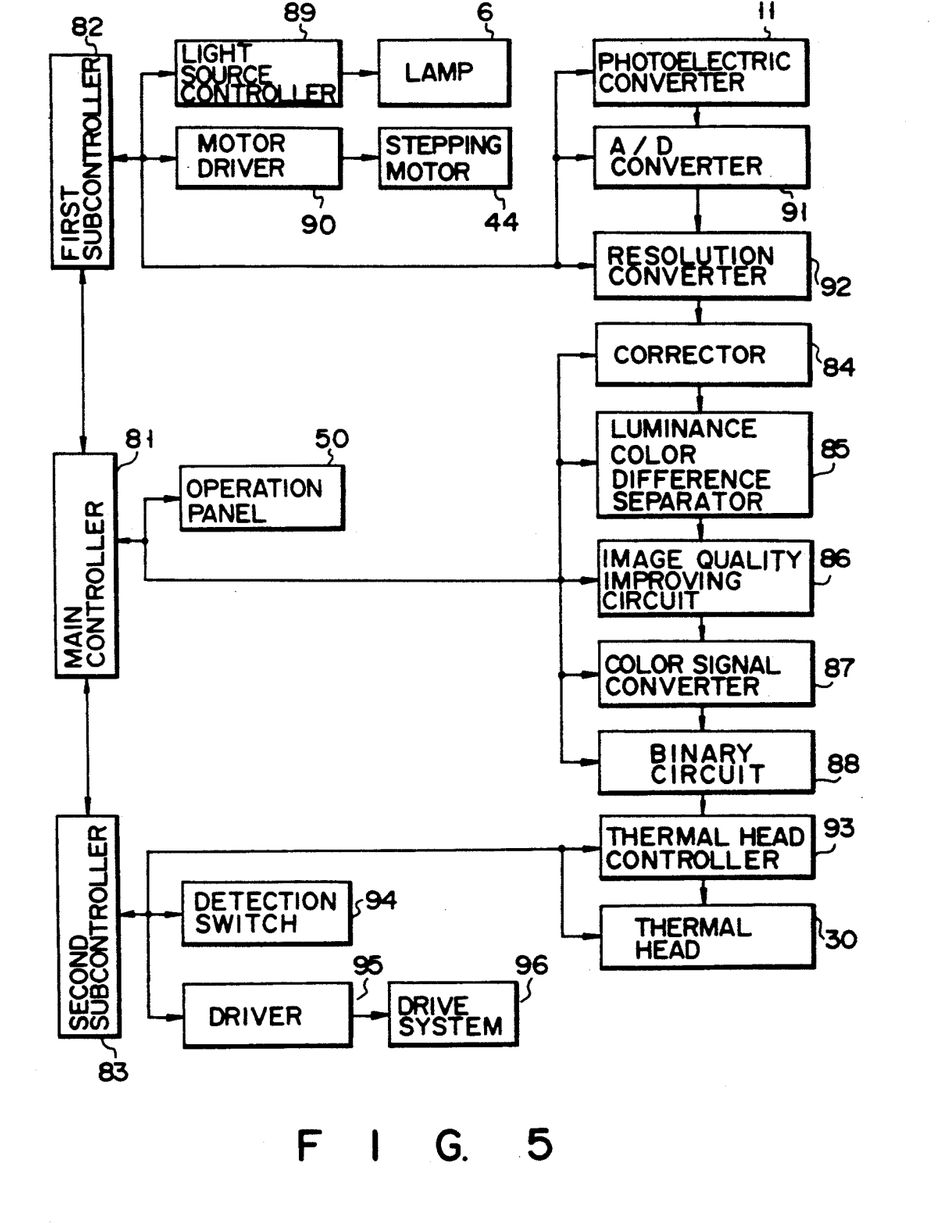
FIG. 5 is a block diagram schematically showing an overall control system of the image forming apparatus.

FIG. 5 schematically shows the control unit 12.

A main controller 81 controls the overall apparatus and is connected to the operation panel 50, a first subcontroller 82, a second subcontroller 83, a corrector 84, a luminance color difference separator 85, an image quality improving circuit 86, a color signal converter 87, and a binary circuit 88.

The first subcontroller 82 is connected to and controls a light source controller 89, a motor driver 90, the photoelectric converter 11, an A/D converter 91, and a resolution converter 92.

The light source controller 89 is connected to the lamp 6 and controls ON/OFF and a light amount of the lamp 6 upon image reading.

The motor driver 90 drives the stepping motor 44.

The second subcontroller 83 is connected to a thermal head controller 93, the thermal head 30, various detection switches 94, and a driver 95.

The driver 95 is connected to a drive system 96 including a motor, a solenoid, and the like.

The A/D converter 91 converts an analog color signal output from the photoelectric converter 11 into a digital signal and outputs the signal to the resolution converter 92. The resolution converter 92 converts the resolution so that the resolution of the photoelectric converter 11 coincides with that of the thermal head 30.

The corrector 84 performs shading correction for image data having the resolution converted by the resolution converter 92. The luminance color difference separator 85 performs various operations for color signals of cyan (C), green (G), and yellow (Y) supplied from the corrector 84 to separate each signal into a luminance signal, a color difference signal 1, and a color difference signal 2, and supplies the signals to the image quality improving circuit 86.

The circuit 86 analyzes the luminance signal, the color difference signal 1, and the color difference signal 2 to perform image quality improving processing such as edge emphasis or character designation, and supplies the processed signals to the color signal converter 87.

Figure 6:
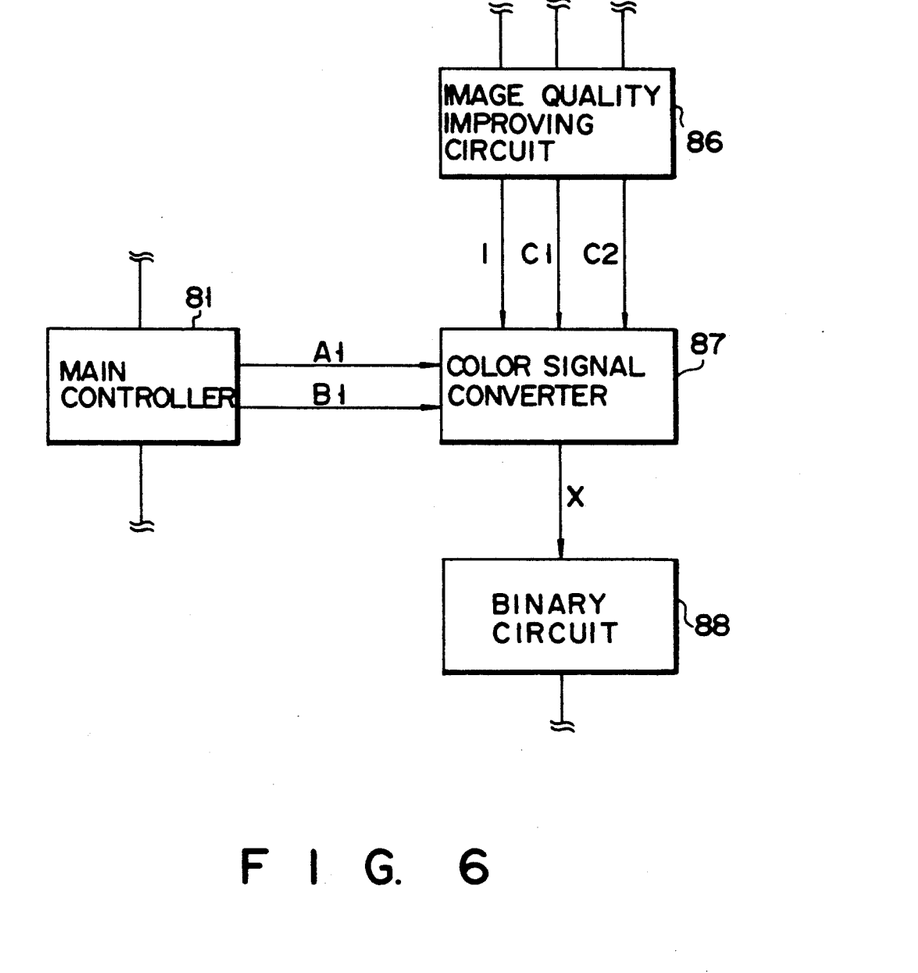
FIG. 6 is a block diagram for explaining in detail a color signal converter shown in FIG. 5.

FIG. 6 shows the color signal converter 87.

The luminance signal (1), the color difference signal 1 (C1), and the color difference signal 2 (C2) output from the image quality improving circuit 86 are supplied to the color signal converter 87. The converter 87 generates color signals of yellow (Y), magenta (M), cyan (C), and black (B) from the supplied signals, and outputs one of the color signals to the binary circuit 88. In this case, selection between the color signals Y, M, C, and B is performed by the main controller 81.

That is, the main controller 81 supplies signals A1 and B1 to the color signal converter 87, and a color signal X is automatically selected from one of Y, M, C, and B in accordance with a combination of the signals A1 and B1 as shown in Table 1 below.

TABLE 1

| A1 | B1 | X |
| --- | --- | --- |
| 0 | 0 | Y |
| 0 | 1 | M |
| 1 | 0 | C |
| 1 | 1 | B |

Figure 7:
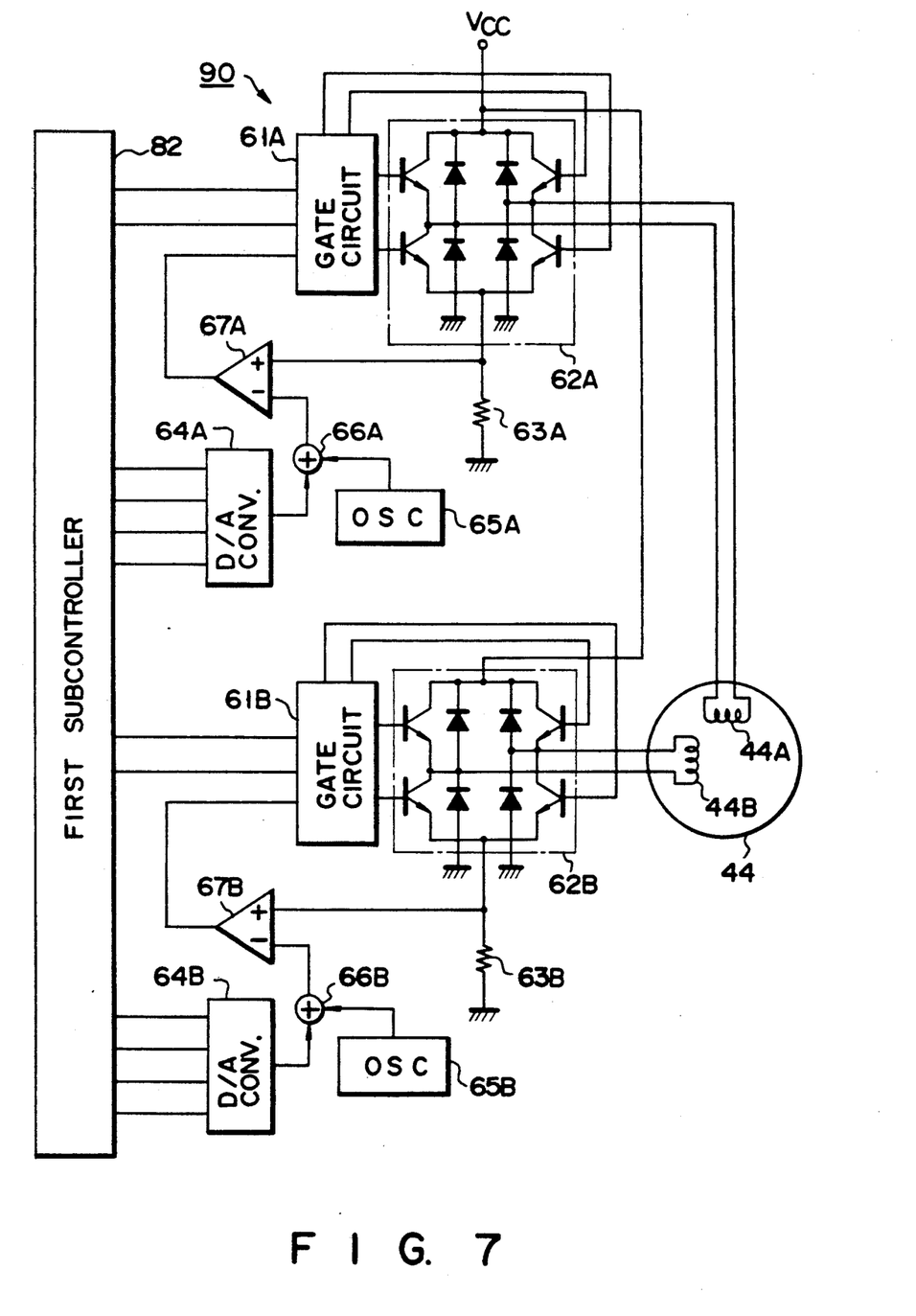
FIG. 7 is a block diagram showing a motor driving unit shown in FIG. 5.

FIG. 7 shows the motor driver 90. This motor driver 90 is a driver for a 2-phase bipolar stepping motor based on a pulse-width modulating scheme.

In accordance with a phase switching signal and a current switching signal supplied from the first subcontroller 82, the motor driver 90 excites an excitation phase of the stepping motor 44 with a small or large current, thereby rotating the motor with a different torque.

That is, the first subcontroller 82 is connected to and supplies the phase switching signal to gate circuits 61A and 61B. The circuits 61A and 61B generate gate signals in accordance with the phase switching signal supplied from the first subcontroller 82. The circuits 61A and 61B are connected to drivers 62A and 62B which are connected to coils 44A and 44B of the stepping motor 44, respectively. The drivers 62A and 62B switch the excitation phase of the motor 44 in accordance with the gate signals generated by the circuits 61A and 61B, respectively. The drivers 62A and 62B are also connected to resistors 63A and 63B for detecting drive currents of the drivers 62A and 62B, respectively.

The first subcontroller 82 is connected to and supplies, e.g., a 4-bit current switching signal to D/A converters 64A and 64B. The output terminals of the converters 64A and 64B and the output terminals of oscillators 65A and 65B are connected to adders 66A and 66B, respectively. The oscillators 65A and 65B output sawtooth-wave signals having predetermined periods to the adders 66A and 66B, respectively. The adders 66A and 66B synthesize the sawtooth-wave signals supplied from the oscillators 65A and 65B with DC signals corresponding to the current switching signals output from the D/A converters 64A and 64B, respectively. The output terminals of the adders 66A and 66B are connected to input terminals of comparators 67A and 67B, respectively. The other input terminals of the comparators 67A and 67B are connected to the resistors 63A and 63B, respectively. The comparators 67A and 67B compare the drive currents of the drivers 62A and 62B detected by the resistors 63A and 63B with the signals output from the adders 66A and 66B, respectively, and generate pulse signals having different duties in accordance with the drive currents. These pulse signals are supplied to the gate circuits 61A and 61B, and the gate signals are controlled in accordance with the pulse signals, thereby driving the stepping motor 44 with a small or large current.

An operation of the above arrangement will be described below.

The original O is placed on the original table 2, and the original cover 5 is closed. In this case, in order to perform copying of one sheet under standard copy conditions, the copy key 51 is depressed.

In order to change the copy conditions, various keys on the operation panel 50 are depressed to set the copy condition, and then the key 51 is depressed.

For example, when a copy magnification from 70% to 150% is set by the DOWN key 55A or UP key 55C, the second subcontroller 83 outputs a drive signal to the driver 95 to move the zoom lens 9 and the mirror units 10A and 10B to positions corresponding to the set copy magnification.

The first subcontroller 82 supplies a phase switching signal for moving the first and second carriages 41 and 42 at a high speed to the gate circuits 61A and 61B of the motor driver 90, and supplies a high current switching signal to the D/A converters 64A and 64B. Therefore, the comparators 67A and 67B output pulse signals having a large duty ratio to the gate circuits 61A and 61B, respectively. The drivers 62A and 62B rotate the stepping motor 44 at a high speed and a high torque in accordance with outputs from the circuits 61A and 61B, respectively.

When a copy magnification from 150% to 400% is set by the UP key 55C, the second subcontroller 83 outputs a drive signal to the driver 95 to move the lens 9 and the mirror units 10A and 10B to positions corresponding to the set copy magnification.

The first subcontroller 82 supplies a phase switching signal for moving the first and second carriages 41 and 42 at a low speed to the gate circuits 61A and 61B of the motor driver 90, and supplies a low current switching signal to the D/A converters 64A and 64B. Therefore, the comparators 67A and 67B output pulse signals having a small duty ratio to the circuits 61A and 61B, respectively. The drivers 62A and 62B rotate the stepping motor 44 at a low speed and a low torque in accordance with outputs from the circuits 61A and 61B, respectively.

When the first and second carriages 41 and 42 are driven in accordance with the set copy magnification as described above, the original O placed on the table 2 is exposed and scanned by light emitted from the lamp 6. Light reflected by the original O is imaged on the photoelectric converter 11 through the mirrors 7, 8A, and 8B, the zoom lens 9, and the mirror units 10A and 10B, and converted into an electrical signal by the converter 11.

An output signal from the photoelectric converter 11 is supplied to the A/D converter 91 shown in FIG. 5 and converted into a digital signal by the converter 91. An output signal from the A/D converter 91 is supplied to the resolution converter 92. The converter 92 converts the resolution such that the resolution of the photoelectric converter 11 coincides with that of the thermal head 30, and supplies the conversion result to the corrector 84.

In order to correct an error of the photoelectric converter 11, the corrector 84 performs shading correction for the color signals of cyan (C), green (G), and yellow (Y) supplied from the resolution converter 92, and supplies the obtained signals to the luminance color difference separator 85.

The separator 85 performs various operations for the color signals of cyan (C), green (G), and yellow (Y) supplied from the corrector 84 to separate each signal into the luminance signal, the color difference signal 1 (C1), and the color difference signal 2 (C2), and supplies the signals to the image quality improving circuit 86.

The circuit 86 analyzes the luminance signal and the color difference signals 1 and 2 to perform image quality improving processing such as edge emphasis or character designation, and supplies the signals to the color signal converter 87.

The converter 87 generates a color signal of one of yellow (Y), magenta (M), cyan (C), and black (B) corresponding to inks of the ink ribbon 31 in accordance with the luminance signal and the color difference signals 1 and 2 having the improve image quality, changes the level of the color signal in correspondence with a density signal supplied from the main controller 81, and supplies the signal to the binary circuit 88.

The binary circuit 88 converts the color signal supplied from the converter 87 into a binary signal by a dither method or the like, and supplies the binary signal to the thermal head controller 93. The controller 93 controls the thermal head 30 in accordance with the binary signal supplied from the binary circuit 88.

In response to depression of the copy key 51, the paper P in the paper feed cassette 20 is picked up by the pick-up roller 21 and conveyed to the platen drum 25 by the conveyor rollers 22 and the register rollers 23. The leading end of the paper P is fixed by the gripper 28.

Thereafter, the thermal head 30 is urged against the drum 25 as the drum 25 rotates, thereby printing an image corresponding to an original image on the paper P by the operation described above.

When printing is finished, under the control of the main controller 81 and the first subcontroller 82, the light source controller 89 turns off the lamp 6, and the paper P wound around the drum 25 is exhausted to the paper exhaust tray 37, thereby completing the copy operation.

As described above, when a copy magnification from 70% to 150% is set, the first subcontroller 82 supplies the phase switching signal for a high speed and the high current switching signal to the motor driver 90, and the driver 90 rotates the stepping motor 44 at a high speed with a large current. When a copy magnification from 150% to 400% is set, the first subcontroller 82 supplies the phase switching signal for a low speed and the low current switching signal to the motor driver 90, and the driver 90 decreases the rotational speed and the drive current of the stepping motor 44. Therefore, a torque of the motor 44 need not be decreased to perform copying at a normal magnification, and vibration or noise of the motor 44 can be suppressed when the motor 44 is driven at a low speed in order to perform copying at a large magnification.

In the above embodiment, the present invention is applied to a digital copying machine. The present invention, however, is not limited to the above embodiment.

Figure 8:
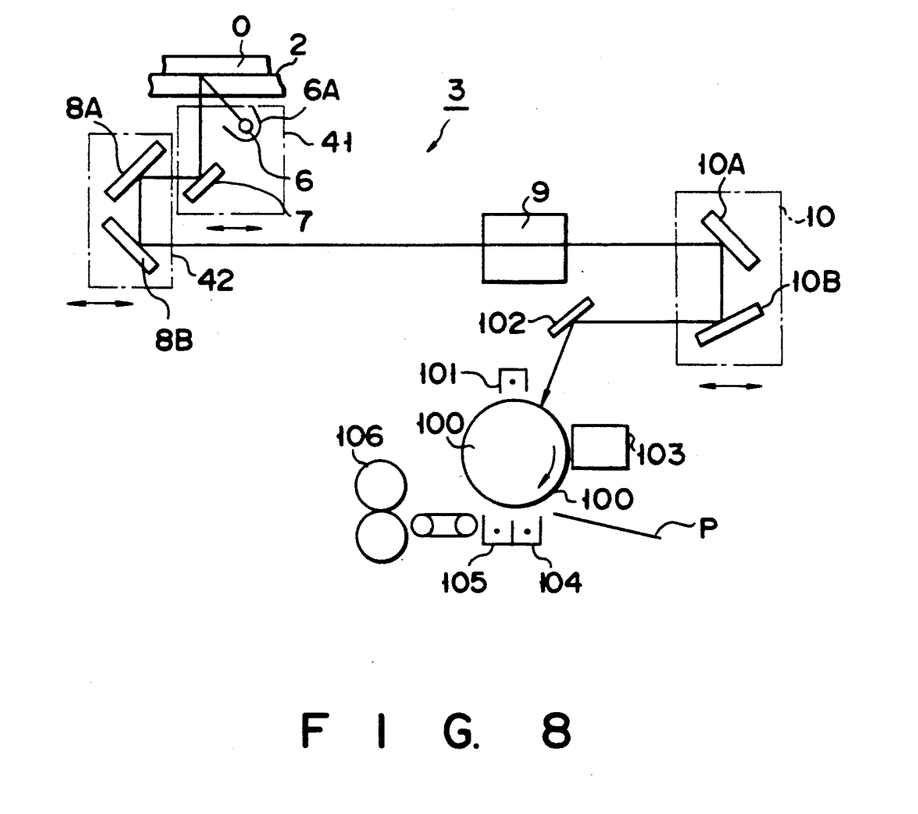
FIG. 8 is a schematic view showing another embodiment of the present invention.

FIG. 8 shows another embodiment in which the present invention is applied to a conventional electronic copying machine. In FIG. 8, the same reference numerals as in FIG. 1 denote the same parts, and only different parts will be described below.

The surface of photosensitive drum 100 is charged by an electric charger 101. When light guided from an original by a scanning unit 3 is radiated on the surface of the drum 100 by a mirror 102, an electrostatic latent image is formed on the surface of the drum 100 in accordance with the radiated light. This electrostatic latent image is developed by a developing unit 103, and the development toner image is transferred onto paper P by a transfer charger 104. The paper P on which the toner image is transferred is separated from the drum 100 by a separation charger 105, and the tone image is fixed on the paper P by a fixing unit 106.

In such an electronic copying machine, by controlling a stepping motor 44 for driving first and second carriages 41 and 42 of the scanning unit 3 in the same manner as in the above embodiment, a torque of the motor 44 need not be decreased in order to perform copying at a normal magnification, and vibration and noise of the motor 44 can be suppressed when the motor 44 is driven at a low speed in order to perform copying at a large magnification.

The present invention can be variously modified and carried out without departing from the spirit and scope of the invention.

What is claimed is:

1. An image forming apparatus for forming an image of an original on a transfer material, said apparatus comprising:

means for scanning the image of the original;
stepping motor means for moving the scanning means along the original;
means for forming the image scanned by the scanning means on the transfer material;
first setting means for setting a magnification of the image to be formed by the forming means; and
second setting means for setting a moving speed of the stepping motor means to a first speed, and supplying a first current to the stepping motor means when the magnification set by said first setting means falls within a predetermined range, and setting the moving speed of the stepping motor means to a second speed which is lower than the first speed, and supplying a second current which is lower than the first current to said stepping motor means when the magnification exceeds the predetermined range;
wherein the second setting means further comprises:
means for outputting a phase switching signal for setting the speed of the stepping motor means and a current switching signal for setting a driving force of the stepping motor means;
first control means, for controlling the speed of the stepping motor means in accordance with the phase switching signal output from the output means;
means for detecting a current output from the first control means; and
second control means for controlling the driving force of the stepping motor means in accordance with the current detected by the detecting means and the current switching signal supplied from the output means.

2. An apparatus according to claim 1, wherein the forming means comprises:
means for converting light guided from the original by the scanning means into an electrical signal; and
means for transferring color materials on the transfer material in accordance with the electrical signal converted by the converting means.

3. An image forming apparatus for forming an image of an original on a transfer material, said apparatus comprising:
means for scanning the image of the original;
stepping motor means for moving the scanning means along the original;
means for forming the image scanned by the scanning means on the transfer material;
setting means for setting a magnification of the image to be formed by the forming means;
means for outputting a first phase switching signal for driving the stepping motor at a first speed and a first current switching signal for driving the stepping motor with a first driving force when the set magnification falls within a predetermined range, and outputting a second phase switching signal for driving the stepping motor at a second speed slower than the first speed and a second current switching signal for driving the stepping motor with a second driving force weaker than the first driving force when the set magnification exceeds the predetermined range;
first control means for controlling a speed of the stepping motor means in accordance with the first and second phase switching signal output from the output means;
means for detecting a current output from the first control means; and
second control means for controlling a driving force of the stepping motor in accordance with the current detected by the detecting means and the first and second current switching signals supplied from the output means.

4. An apparatus according to claim 3, wherein the first control means includes:
gate means for generating a gate signal means in accordance with the first and second phase switching signals; and
means for driving the stepping motor means in accordance with the gate signal output from the gate means.

5. An apparatus according to claim 4, wherein the second control means includes:
means for converting the first and second current switching signals output from the output means into a DC signal;
means for oscillating a sawtooth-wave signal having a predetermined period;
means for synthesizing a sawtooth-wave signal oscillated by the oscillating means with the DC signal converted by the converting means; and
means for comparing the signal synthesized by said synthesizing means with the current detected by the detecting means, to obtain a particular result and controlling the gate means in accordance with said result.

6. An image forming apparatus for forming an image of an original on a transfer material, said apparatus comprising:
a scanner for scanning the image of the original;
a stepping motor for moving the scanner along the original;
a forming section for forming the image scanned by the scanner on the transfer material;
a first setting section for setting a magnification of the image to be formed by the forming section; and
a second setting section for setting a moving speed of the scanner to a first speed, and supplying a first current to the stepping motor when the magnification set by said first setting section falls within a predetermined range, and setting the moving speed of the stepping motor to a second speed which is lower than the first speed, and supplying a second current which is lower than the first current to said stepping motor when the magnification exceeds the predetermined range, wherein said second setting circuit further comprises:

an outputting circuit for outputting a phase switching signal for setting a speed of the stepping motor and a current switching signal for setting a driving force of the stepping motor;

a first controller, for controlling the speed of the stepping motor in accordance with the phase switching signal output from the outputting circuit;

a detecting circuit for detecting a current output from the first controller; and a second controller, for controller the driving force of the stepping motor in accordance with the current detected by the detecting circuit and the current switching signal supplied from the outputting circuit.

7. An apparatus according to claim 6, wherein the first control means includes:

gate means for generating a gate signal in accordance with the phase switching signal; and means for driving the stepping motor in accordance with the gate signal output from the gate means.

8. An apparatus according to claim 7, wherein the second control means includes:

means for converting the current switching signal output from the output means into a DC signal;

means for oscillating a sawtooth-wave signal having a predetermined period;

means for synthesizing the sawtooth-wave signal oscillated by the oscillating means with the DC signal converted by the converting means; and means for comparing the signal synthesized by said synthesizing means with the current detected by the detecting means, and controlling the gate means in accordance with the comparison result.

* * * * *